United States Patent [19]
Hoffman et al.

[11] Patent Number: 5,113,127
[45] Date of Patent: May 12, 1992

[54] UNIVERSAL BATTERY CHARGER

[75] Inventors: Philip K. Hoffman, Wilmington, Vt.; Douglas R. Frey, Bethlehem, Pa.

[73] Assignee: Solid State Chargers, Inc., Cockeysville, Md.

[21] Appl. No.: 336,065

[22] Filed: Apr. 11, 1989

[51] Int. Cl.$^5$ .................... H02J 7/10; H02M 3/335
[52] U.S. Cl. ........................ 320/21; 320/39; 320/59; 363/20
[58] Field of Search .......... 320/21, 32, 39, 14, 320/59; 363/20

[56] References Cited

U.S. PATENT DOCUMENTS

| | | | |
|---|---|---|---|
| 3,673,485 | 6/1972 | Vital et al. | 320/2 |
| 4,260,943 | 4/1982 | Zaderej et al. | 320/21 |
| 4,376,263 | 3/1983 | Pittroff et al. | 320/32 |
| 4,423,476 | 12/1983 | Neumann | 320/59 X |
| 4,523,139 | 6/1985 | Schwarz et al. | 320/40 |
| 4,629,963 | 12/1986 | Morris | 320/3 |
| 4,710,695 | 12/1987 | Yamada et al. | 320/21 |
| 4,829,225 | 5/1989 | Podrazhansky et al. | 320/14 |

*Primary Examiner*—R. J. Hickey
*Attorney, Agent, or Firm*—Leonard Bloom

[57] ABSTRACT

A battery charger of the driven blocking oscillator type includes a three-winding transformer. The primary winding is connected in series with the collector-emitter path of a switching transistor. The secondary winding is connected in series with the collector-emitter path of a sense transistor which responds to the current flowing through the switching transistor. The tertiary winding is connected in series with the battery, series-connected batteries or series-connected battery packs sought to be recharged, via a diode, which may be connected in parallel with a capacitor. No smoothing capacitor is provided across the battery or batteries. The battery or batteries are charged by current pulses and discharge through the tertiary winding to repolarize the diode (and capacitor if present). The secondary winding is poled, with respect to the tertiary winding so that the blocking oscillator is driven by energy from the battery or batteries. The battery charger can operate over a wide range of input voltages with high efficiency, making it useful worldwide. The charger is effective to charge batteries and series connections thereof over a wide range of battery voltages. The charger will only function if at least one rechargeable battery is in circuit for charging. The charger may include circuitry for automatically taking substantially charged batteries or battery out of the charge path.

33 Claims, 4 Drawing Sheets

UNIVERSAL BATTERY CHARGER

FIELD OF THE INVENTION

The present invention relates to battery chargers. More particularly, it relates to battery chargers employing current converters of the blocking oscillator type. The blocking oscillator may receive energy from a wide variety of sources of alternating or direct current and serves to convert such input energy suitable for charging one or more storage cells.

BACKGROUND OF THE INVENTION

Storage batteries, especially of the nickel-cadmium type, are widely used as power sources for portable tools and appliances even where power from public utilities may be readily accessible. Batteries of relatively small capacity are used in such devices so that battery size and weight will not detract from the convenience of use and portability of the device in which the battery is installed. The small capacity of such batteries requires that they be frequently recharged, often after each use of the device in which they are installed, so that the device will be able to deliver full service at any needed time.

It is normal commercial practice, therefore, to include a battery charqer with each storage battery operated device sold. Such chargers are of the simplest possible circuit design intended to receive input power only from a source of specified characteristics and to deliver charging current only to the battery contained in the device with which it is sold. The lack of universality of such chargers impairs the convenience of battery operated devices. If the device is to be used in an area where the utility power differs from that of the area in which the device was originally designed or power differs from that of the area in which the device was originally sold, it is necessary to replace the charger. If the charger designed for use with a particular device is misplaced or damaged, often a charger designed for another device cannot be substituted for the original charger.

A variety of battery charger circuits have been developed in response to these problems. Chargers of the type using a blocking oscillator as a current converter are of interest herein. In this type charger the charging current supplied to the battery is, in general, dependent upon a threshold set by a sensing part of the circuitry. This threshold is independent of the supply voltage in large part since it is designed to sense current. Therefore, this type of charger can be designed to accept input power from sources having a wide range of voltages while still delivering substantially constant charging current to the battery.

PRIOR ART

U.S. Pat. No. 4,376,263, issued Mar. 8, 1983, discloses a blocking oscillator type battery charger having a two-winding transformer, two switching transistors and capacitive feedback from the transformer secondary to the primary transistor to provide regenerative action. The oscillator is free-running and continues to oscillate when the battery is connected in the charging circuit. The battery under charge is not transformer isolated from the input power circuit.

U.S. Pat. No. 4,710,695, issued Dec. 1, 1987, discloses a battery charger of the blocking oscillator type which includes a three-winding transformer (FIG. 8). The battery under charge is isolated from the input power supply by the third transformer winding. The oscillator circuit includes a switching transistor which receives a forward bias through a resistor directly connected between the power supply and the base of the switching transistor. The oscillator is free running and does not depend upon the presence of a battery to maintain oscillation. A smoothing capacitor is connected across the battery being recharged.

It is an object of the present invention to provide a battery charger capable of operating with a wide variety of input power sources.

It is another object of the invention to provide a battery charger capable of charging a plurality of batteries simultaneously.

It is a further object of the invention to provide a battery charger in which the battery or batteries under charge are isolated from direct connection to the input power supply, for safety purposes.

It is still another object of the invention to provide a battery charger which is highly efficient in operation and which consumes power only when one or more batteries capable of accepting a charge are connected in the charging circuit thereof.

These and other objects and advantages of the invention are to become apparent as a complete understanding of the invention is gained through the complete description of the invention as set out below, reference being made to the accompanying figures of drawing wherein like reference numerals designate like circuit components.

SUMMARY OF THE INVENTION

The battery charger of the invention is of the driven blocking oscillator type. The driven oscillator includes a switching transistor, a feedback transistor and a three-winding transformer. The switching transistor controls current flow from the power supply through the transformer primary winding. The transformer secondary winding is phased with respect to the primary to provide positive feedback to the switching transistor. The sense transistor detects the current, and in conjunction with feedback circuitry, insures a rapid transition of the switching transistor from a conducting to a non-conducting state. The battery or batteries under charge receive charging current from the transformer tertiary winding which isolates the battery or batteries being charged from the power supply. The network connected between the secondary winding and the switching transistor is such that the switching transistor is retriggered only through a specific feedback action between the transformer tertiary and secondary windings, which action is dependent upon the presence of a chargeable battery in the circuit of the transformer tertiary winding.

DETAILED DESCRIPTION OF THE PREFERRED EMBODIMENTS

Figure 1:
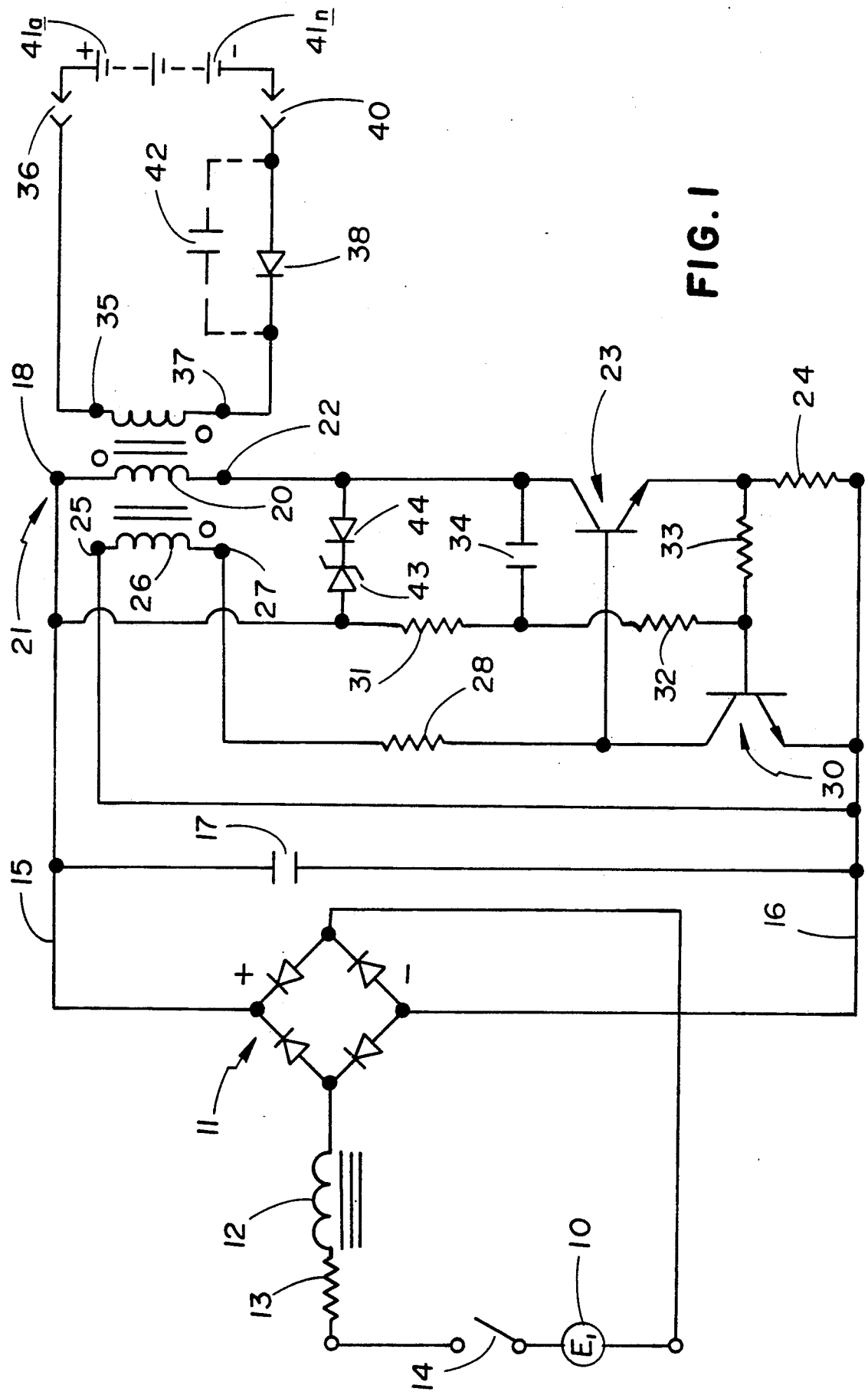
FIG. 1 is a schematic diagram of a first exemplary embodiment of a battery charger of the present invention.

The battery charger circuit of the invention, as illustrated in FIG. 1, includes a source 10 of input power which may be an a.c. or d.c. source ranging in voltage from about 36v. to about 230v. The source 10 supplies current to a rectifier bridge 11 through an inductor 12 connected in series to the source 10 via a resistor 13 and a switch 14. The positive output terminal of the bridge 11 is connected to a B+ supply line 15 and the negative output terminal of the bridge 11 is connected to a return line 16. A filter capacitor 17 is connected across the lines 15 and 16. A terminal 18 of a primary winding 20 of a three-winding transformer 21 is connected to the B+ line 15. A terminal 22 of the primary winding 20 is connected to the collector of a switching transistor 23, the emitter of which is connected to the return line 16 through a low value resistor 24. A terminal 25 of transformer secondary winding 26 is connected to the return line 16. A terminal 27 of the secondary winding 26 is connected through resistor 28 to the base of the transistor 23. The collector of a sense transistor 30 is connected to the base of transistor 23 and the emitter thereof is connected to the return line 16. Resistors 31 and 32, connected in series between the line 15 and the base of the transistor 30, together with a resistor 33 and the resistor 24, form a voltage divider for biasing the transistor 30. A feedback capacitor 34 is connected between the junction of the resistors 31 and 32 and the collector of transistor 23.

The terminals 18 and 27 of the primary and secondary windings of the transformer 21 are of like phase to provide a regenerative action, as is described hereinbelow.

A terminal 35 of the tertiary winding of transformer 21 is connected to the female terminal of a first output connector 36. A terminal 37 of the transformer tertiary winding is connected to the cathode of a diode 38, the anode of which is connected to the female terminal of a second output connector 40. The diode 38, which has an intrinsic capacitance between its anode and cathode, may be paralleled by a connected capacitor 42 for reasons described hereinbelow. In realized embodiments, it has been found that a 1N4007 diode may be used as the diode 38 even without the capacitor 42.

One or more of batteries 41a-41n to be charged are connected in series, with the positive terminal of the first battery 41a of the series connected to the male contact of the connector 36 and the negative terminal of the last battery 41n in the series connected to the male contact of the connector 40. Connection of the batteries to be charged to the charger may be facilitated by the use of a multi-station charging system as described in U.S. Pat. No. 4,591,777 for "Multi-Station Modular Charging System for Cordless Tools and Appliances", issued May 27, 1988 and assigned to the assignee of the present invention. It is to be understood that the term battery, as used herein, includes single cell batteries, multiple cell batteries and battery packs.

A Zener diode 43 and a surge-protecting diode 44 are connected in series across the primary winding 20 of the transformer 21, their respective anodes being connected to the respective terminals 18 and 22 of the primary winding. The diodes 43 and 44 serve to protect the switching transistor 23 from large voltage pulses which may appear across the primary winding 20.

The charger circuit of FIG. 1 operates as a driven blocking oscillator. At start-up, the transistors 23 and 30 are initially non-conducting. Upon the application of power from the source 10 a positive voltage pulse is conducted by capacitor 34 to the primary winding 20 and due to its base-collector capacitance, and the transistor 23, due to its base-collector capacitance, begins to conduct. Then the current into the primary winding 20 induces a positive voltage at terminal 27 of the secondary winding of transformer 21 which reinforces the signal that appears at the base of transistor 23 and the collector of transistor 30. This regenerative action continues and the transistor 23 conducts more heavily, raising the voltage at the emitter thereof which is applied through resistor 33 to the base of the transistor 30. The resistor 24 provides a voltage at its end remote from the return line 16 proportional to the current flowing in the primary winding 20. The resistor 33 provides an additional drop due to two effects. There is a small voltage proportional to the supply voltage due to the voltage divider comprising the resistors 31, 32, 33 and 24. In addition there is a voltage component due to any a.c. components in the signal at the collector of the transistor 23. During the regenerative phase, only the small component proportional to line voltage appears across the resistor 33. This adds to the voltage across the resistor 24 to produce the base voltage for the sense transistor 30. When this voltage, predominantly made up of the drop across the resistor 24 proportional to the current in the primary winding 20 reaches about 0.6 volts, the transistor 30 begins to conduct diverting base drive away from the transistor 23. This tends to decrease the primary current, by inhibiting the regeneration, causing the voltage at the collector of the transistor 23 to abruptly rise. The capacitor 34 couples this sharp rise into the divider which affects the resistor 33, with the net result being that the voltage at the base of transistor 30 experiences a positive jump. This causes the transistor 30 to conduct more heavily, further cutting the base drive to the transistor 23 and, consequently, speeding the decrease of current in the primary winding 20. The net result is a greatly enhanced shut-off of the primary current, precipitating the commutation of the voltages on the windings of the transformer 21 to shut down conduction on the primary side and to initiate conduction on the tertiary side, that is in the tertiary winding. The threshold of switching occurs due to the transistor 30 sensing predominantly the current in the primary winding 20. In this way, constant current is maintained over supply voltage. Since there is a small change in peak current proportional to supply voltage due to switching dynamics, the small voltage component proportional to supply voltage across the resistor 33 is added to just counteract this effect, resulting in excellent current regulation against variations in supply.

Looking now at the events in the tertiary winding of the transformer 21, as current flows into the terminal 18 of the transformer primary winding 20, a negative voltage is induced and appears at the terminal 37 of the transformer tertiary winding. Assuming one or more batteries (or battery packs) 41a-41n to be in place, current flow out of the negative terminal of battery 41n is blocked by the diode 38. When the current in the primary winding 20 starts to collapse, a positive voltage is induced at the terminal 35 of the transformer tertiary winding. Charging current can now flow into the positive terminal of battery 41a. The charging current continues to flow until the transformer flux drops to a level insufficient to support a positive voltage across the series combination of the diode 38 and the batteries 41a–41n. At that time a new oscillation cycle is initiated as stated below.

When the voltage across terminals 35 and 37 becomes less positive than the voltage of the batteries 41a–41n (or only one battery if only one is in circuit) the battery or batteries commence to discharge into the terminal 35 of the tertiary winding. No significant discharge current is expected to flow because of the blocking action of diode 38. However, a small reverse current does flow from the battery or batteries 41a–41n because of the stored charge on the intrinsic capacitance of the diode 38 and/or from the stored charge on the capacitor 42, if present to augment the intrinsic capacitance to repolarize the diode 38, after which no further discharge can take place. This small reverse current flow into terminal 35 coupled with the collapse of voltage across the tertiary winding induces a positive voltage at terminal 27 of the transformer secondary winding 26 which again initiates regeneration and the cycle is repeated. Depending upon the characteristics of transformer 21 and the diode 38, it may be desirable to increase the battery discharge current which reinitiates an oscillation cycle. Such is the purpose of the capacitor 42. When the voltage at the terminal 35 is no longer sufficient to force charging current into the positive terminal of battery 41a and the batteries 41a–41n start to discharge, current in addition to that required to repolarize the diode 38 will flow to repolarize the capacitor 42, if present. The amount of such additional current and the time period during which it flows is dependent upon values of the intrinsic capacitance of the diode 38 and the capacitance of the capacitor 42, if present, and the intrinsic resistance of the diode. The time period it takes for the stored charge to migrate across the junction of the diode 38 or recombine with majority carriers can be referred to as a delay.

If no batteries 41a–41n are in place, the circuit of the transformer 21 tertiary winding is open. No smoothing capacitor is connected in parallel with the batteries 41a–41n. No battery discharge current is present to reinitiate an oscillation cycle. The driven blocking oscillator consequently remains idle, except for an occasional sporadic single oscillation cycle initiated by transients.

The frequency of oscillation of the charger circuit is dependent upon the number of batteries to be charged. As the number of batteries in the charging stations is increased, the total voltage of the batteries under charge increases, reducing the time from the start of collapse of the transformer field until time that the voltage induced at terminal 35 can no longer force charging current into the batteries 41a–41n.

The charger circuit of the invention requires no adjustment or alteration to accommodate the various voltages normally encountered as input power sources. The charging current delivered to the battery or batteries under charge is dependent, to first order only, on the current threshold set by the sensing circuitry, which is constant and independent of the voltage of the input power source.

Figure 2:
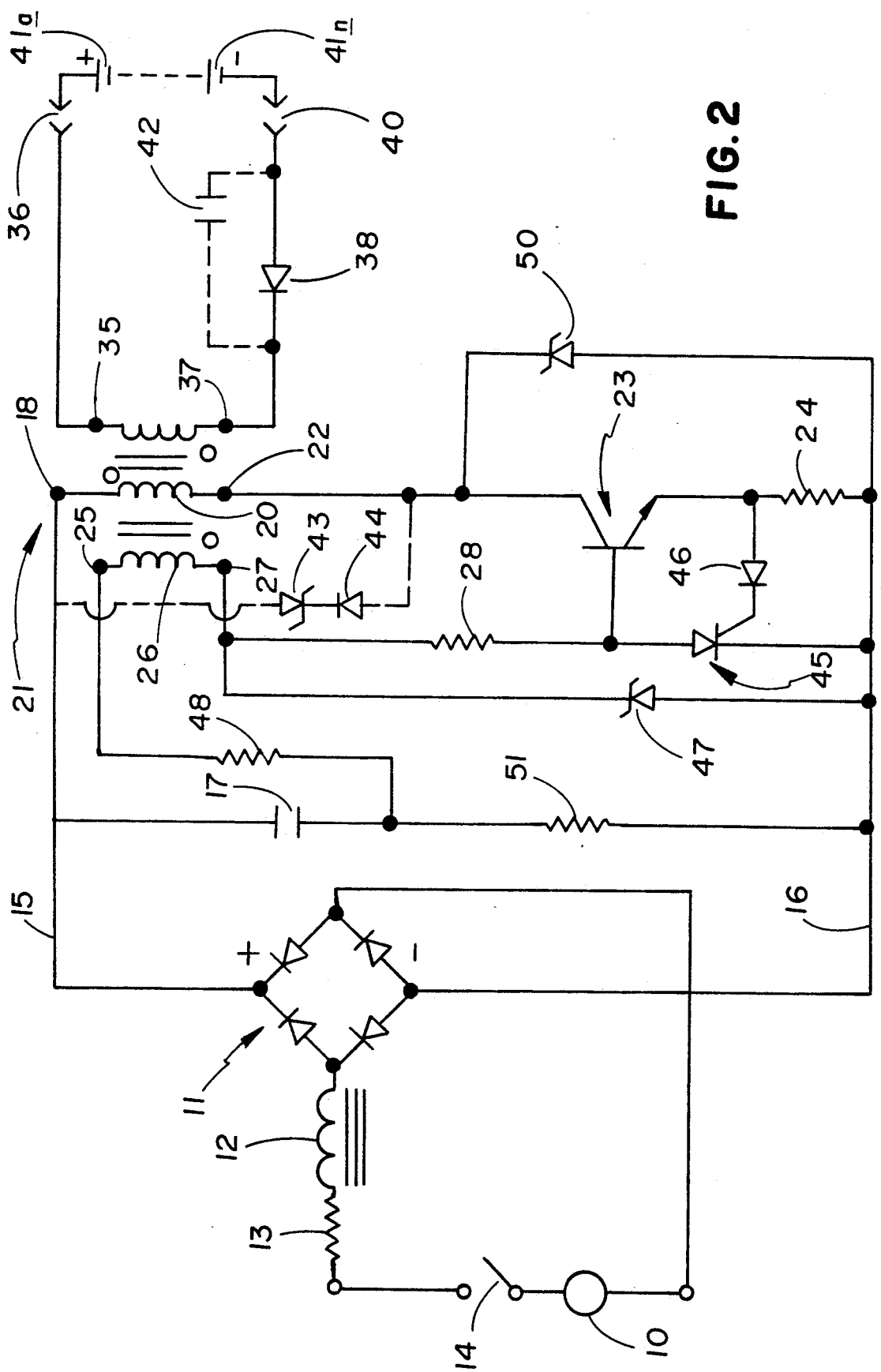
FIG. 2 is a schematic diagram of a second exemplary embodiment of the battery charger of the present invention in which a SCR is used instead of a sense transistor.

FIG. 2 illustrates a modification of the invention shown in FIG. 1 in which an SCR 45 is substituted for the sense transistor 30 (FIG. 1) and other modifications are made, as well. The SCR 45 transitions more rapidly from a non-conducting state to a conducting state than the transistor 30 (FIG. 1) acting alone, when triggered, thereby improving the efficiency of the circuit. The starting circuit, which operates upon the initial application of power, has also been modified as indicated hereinbelow.

The anode of SCR 45 is connected to the base of the transistor 23 and the cathode thereof is connected to the return line 16. The gate electrode of the SCR 45 is connected to the emitter of transistor 23 through a protective diode 46, its anode being connected to the emitter of the switching transistor 23. The cathode of a Zener diode 47 is connected to the terminal 27 of the secondary winding 26 of the transformer 21, the anode thereof being connected to the return line 16. The Zener diode 47 limits the voltage at the terminal 27 to prevent excessive current flow into the base of the transistor 23 which tends to inhibit the turn-off of this transistor. A resistor 48 limits the peak current in the diode 47, improving efficiency. The cathode of a second Zener diode 50 is connected to the terminal 22 of the primary winding 20, the anode thereof being connected to the return line 16 to prevent the application of excessive voltage by the transformer primary winding 20 to the transistor 23. The Zener diode 43 and the diode 44 may be used alternatively to protect the transistor 23, as in the embodiment illustrated in FIG. 1.

The starting circuit of the embodiment of FIG. 2 includes a resistor 51, inserted in series between the filter capacitor 17 and the return line 16. The resistor 48 is connected between the junction of the capacitor 17 with the resistor 51 and the terminal 25 of the transformer secondary winding 26. When power is initially applied to the circuit a positive voltage pulse will appear at the junction of the capacitor 17 and the resistor 51. This positive voltage is applied through the resistor 48 and the secondary winding 26 to the base of the transistor 23 and to the anode of the SCR 45, creating the first cycle of oscillation of the blocking oscillator. Further oscillation cycles, however, require the presence of a chargeable battery or batteries in the circuit of the transformer tertiary winding to provide feedback pulses, just as in the circuit of FIG. 1. The circuit of FIG. 2, when it is driven by a battery or batteries 41a–41n functions in the same fashion as the circuit of FIG. 1.

Figure 3:
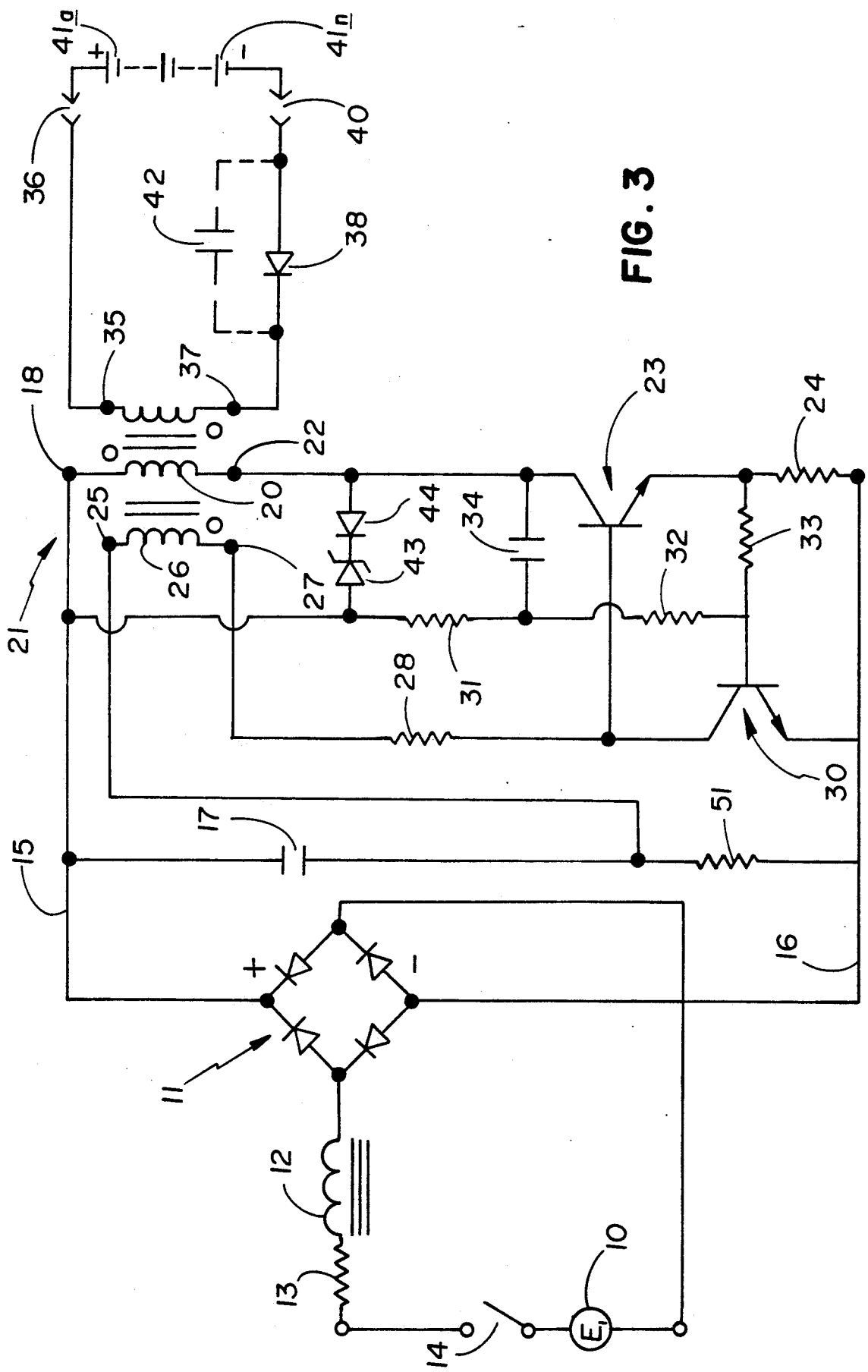
FIG. 3 is a schematic diagram of a third exemplary embodiment of a battery charger of the present invention.

In FIG. 3, a further illustrative embodiment of the battery charger of the present invention incorporates a feature from the circuit of FIG. 2 as a modification to the circuit of FIG. 1. The circuit of FIG. 3 differs from the circuit of FIG. 1 in that the smoothing capacitor 17 is not directly connected to return line 16; rather, as in the circuit of FIG. 2, it is connected to the return line via a resistor 51, the connecting point between the resistor 51 and the capacitor 17 being connected to the collector of the transistor 30 and to the base of the transistor 23 via a series connection through the secondary winding 26 of the transformer 21. Thus, whenever the charger is initially connected to the source 10, a positive voltage spike appears on the collector of the transistor 30 and the base of the transistor 23 assuring the initial triggering of the circuit in a regenerative fashion. Thus, the circuit will operate over a wide range of line and battery voltages. More efficient power consumption is also achieved. The capacitor 34 also aids in initiating conduction of the transistor 23 during the initial cycle.

Figure 4:
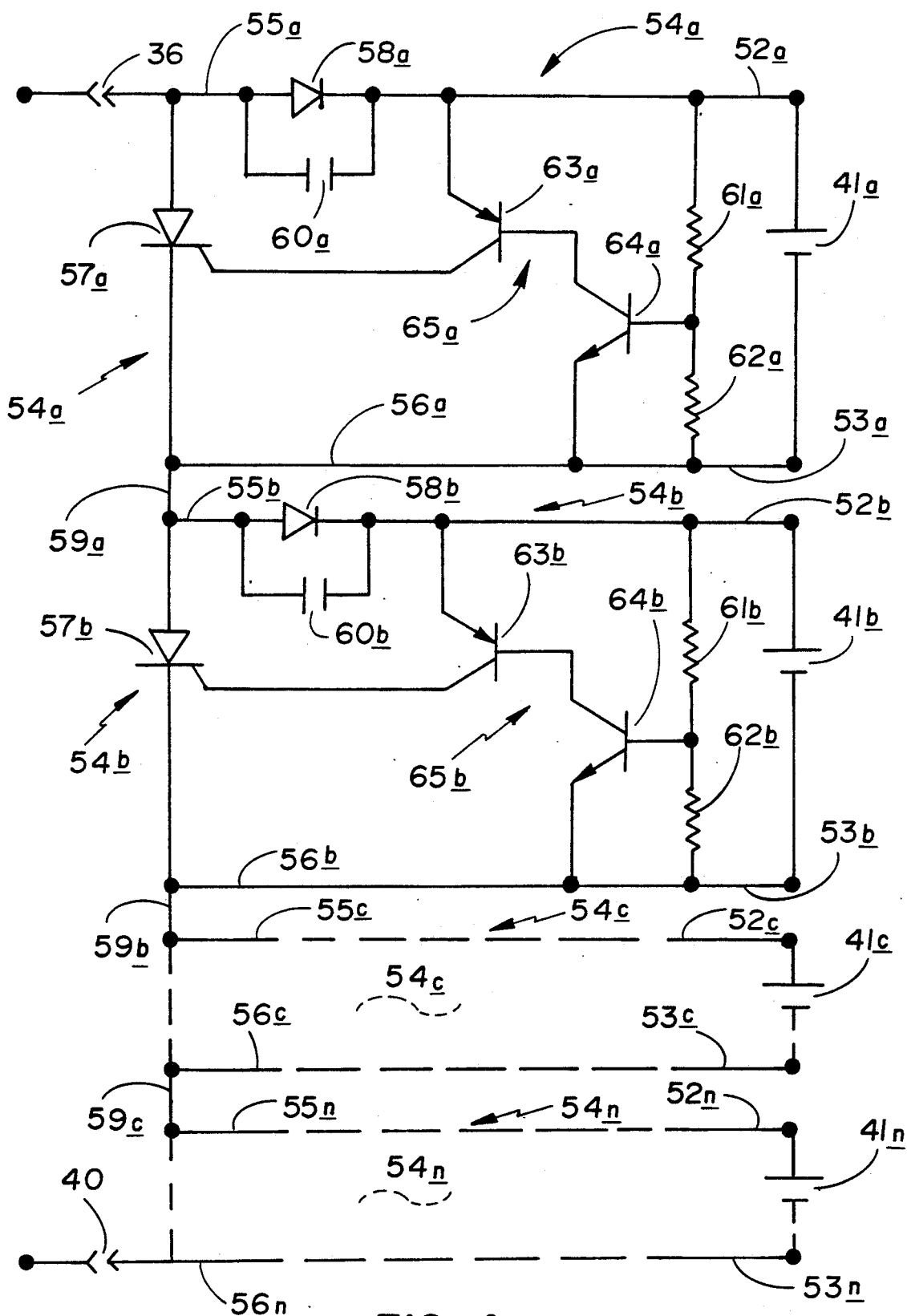
FIG. 4 is a schematic diagram of a multiple station arrangement for charging a plurality of batteries from the battery chargers of FIGS. 1-3 with means for cutting off charging current to the individual batteries whenever each respective battery becomes fully charged.

Although batteries of the nickel-cadmium type are generally tolerant to overcharging, certain types of batteries may be severely damaged by overcharging. FIG. 4 shows a modification in the charger circuits of FIGS. 1-3 which prevents overcharging the batteries under charge. The respective circuits of FIGS. 1-3 (not shown in FIG. 4) are unchanged up to the point of connectors 36 and 40. In FIG. 4, instead of being directly conductively connected in series between the connectors 36 and 40, each of the batteries 41a-41n under charge is respectively connected to respective pairs of output lines 52a-52n and 53a-53n of a similar number of identical modules 54a-54n.

Each of the modules 54a-54n comprises a respective input line 55a-55n and a respective return line 56a-56n. The anode of respective silicon controlled rectifiers (SCR's) (only two 57a, 57b being shown) is connected to a respective input line 55a-55n, the respective cathodes thereof being connected to respective return lines 56a-56n. The anodes of respective diodes (only two 58a, 58b being shown) are connected respectively to the respective input lines 55a-55n and the cathodes thereof are connected to respective output lines 52a-52n. Each of the diodes may be paralleled by a respective capacitor (only two 60a, 60b being shown) to serve the same purpose as the capacitor 42 of FIGS. 1-3. The return line 56a of the first module 54a is directly conductively connected to the input line 55b of the next module 54b via a lead 59a and so on for the succeeding modules 54b-54n via respective leads 59b and 59c. The return line 56n of the last module 54n is connected to the connector 40. Respective voltage dividers comprising respective series connected pairs of resistors (only resistor pairs 61a, 62a and 61b, 62b being shown) are connected across respective output lines 52a, 53a-52n-53n. The voltage dividers sense the terminal voltage of the respective batteries 41a-41n connected across the respective output lines 52a, 53a-52n,53n to the respective batteries 41a-41n. Respective amplifiers (only two 65a, 65b being shown) comprising respective interconnected pairs of transistors (only two pairs 63a, 64a and 63b, 64b being shown) are connected between respect output lines 52a-52n and respective return lines 53a-53n. The emitters of the respective transistor 63a, 63b and so forth are connected to respective output lines 52a-52n; the respective bases thereof are connected to the respective collectors of the respective transistors 64a, 64b and so forth. The respective collectors thereof are respectively connected to the respective gate electrodes of the respective SCR's (only two SCR's 57a and 57b being shown). The bases of the respective transistors 64a, 64b and so forth are connected to the respective junctions of the respective resistors 61a,62a; 61b, 62b and so forth, the respective emitters thereof being connected to the respective return lines 56a-56n.

The pairs of resistors 61a, 62a; 61b, 62b and so on are so proportioned that the bias applied thereby to the respective bases of the respective transistors 64a, 64b and so on will be inadequate to render these respective transistors conductive as long as the voltage of the associated battery 41a-41n is below a critical level. As long as any one of the transistors 64a, 64b and so forth is nonconductive, its associated transistor 63a, 63b and so on will likewise be nonconductive and the gate of the respective associated SCR's 57a, 57b and so on will not be forward biased; thus, the particular SCR will likewise, therefore, be nonconductive. Charging current under these conditions flows into the positive terminal of the respective batteries 41a-41n.

When any of the respective batteries 41a-41n become substantially fully charged (that is charged to the critical level as determined by the selected design), a respective one of transistors 64a, 64b and so on becomes conductive, rendering a respective one of the transistors 63a, 63b and so forth conductive, applying forward bias to the gate of a respective one of the SCR's 57a 57b and so forth to cause the respective SCR to conduct. When any one of the SCR's 57a, 57b and so on conducts, charging current on one of the respective lines 55a-55n flows directly to one of the respective return lines 56a-56n and cannot enter the associated fully charged battery. Charging current continues to flow to the input line of the succeeding module in the chain and so on, until all of the batteries in the series become substantially fully charged. The respective diodes 58a, 58b and so forth prevents associated batteries 41a-41n from discharging through its associated SCR 57a, 57b and so on when the latter becomes conductive, although a small amount of discharge current will flow, as in the circuits of FIGS. 1-3, to repolarize the respective diode 58a, 58b and so on as the diode 38 of FIGS. 1-3, resulting in feedback to the driven blocking oscillator so long as any of the batteries 41a-41n requires more charge.

It is to be appreciated that the aforegoing description of preferred embodiments of the battery charger of the present invention, as well as various subcombinations thereof, have been set out by way of example not by way of limitation. Numerous other embodiments and variants are possible without departing from the spirit and scope of the present invention, its scope being defined in the appended claims.

What is claimed is:

1. In a battery charger of the driven blocking oscillator type which includes a blocking oscillator and means for delivering charging current pulses from the blocking oscillator to one or more series connected batteries, an improvement comprising means responsive to initial application of power to the blocking oscillator for producing a first one of the charging current pulses and means responsive to current flow from the battery or batteries for driving the blocking oscillator to produce subsequent charging current pulses.

2. The improved battery charger of claim 1, wherein the means for delivering current pulses to the battery or batteries includes a transformer winding and a diode connected in series with one another across the battery or batteries.

3. The improved battery charger of claim 2, further including a capacitor connected in parallel with the diode.

4. The improved battery charger of claim 3, wherein the circuit across the battery or batteries is free of any smoothing capacitor.

5. The improved battery charger of claim 2, wherein the circuit across the battery or batteries is free of any smoothing capacitor.

6. The improved battery charger of claim 1, wherein the blocking oscillator includes a transformer having a primary winding, a secondary winding and a tertiary winding; and a diode connected in series with the tertiary winding across the battery or batteries to be charged.

7. The improved battery charger of claim 6, further including a capacitor connected in parallel with the diode.

8. The improved battery charger of claim 7, wherein the circuit across the battery or batteries is free of any smoothing capacitor.

9. The improved battery charger of claim 6, wherein the circuit across the battery or batteries is free of any smoothing capacitor.

10. The improved battery charger of claim 1, further including means responsive to terminal voltage of one battery for removing it from the charging current path whenever the one battery is or becomes substantially fully charged.

11. In a battery charger of the driven blocking oscillator type which includes a blocking oscillator and means for delivering charging current pulses from the blocking oscillator to a plurality of series connected batteries, an improvement comprising means responsive to initial application of power to the blocking oscillator for producing a first one of the charging current pulses and means responsive to current flow from at least one of the batteries for driving the blocking oscillator to produce subsequent charging current pulses.

12. The improved battery charger of claim 11, wherein the means for delivering current pulses to the plurality batteries includes a transformer winding and a diode connected in series with one another across the batteries.

13. The improved battery charger of claim 12, further including a capacitor connected in parallel with the diode.

14. The improved battery charger of claim 13, wherein the circuit across the batteries is free of any smoothing capacitors.

15. The improved battery charger of claim 12, wherein the circuit across the batteries is free of any smoothing capacitor.

16. The improved battery charger of claim 11, wherein the blocking oscillator includes a transformer having a primary winding, a secondary winding and a tertiary winding; and a diode connected in series with the tertiary winding across the batteries to be charged.

17. The improved battery charger of claim 16, further including a capacitor connected in parallel with the diode.

18. The improved battery charger of claim 17, wherein the circuit across the batteries is free of any smoothing capacitor.

19. The improved battery charger of claim 16, wherein the circuit across the batteries is free of any smoothing capacitor.

20. The improved battery charger of claim 11, further including respective means responsive to respective terminal voltages of respective ones of the batteries for removing individual ones of the batteries from the charging current path whenever said individual ones of the batteries is or becomes substantially fully charged.

21. In a battery charger of the driven blocking oscillator type which includes a blocking oscillator and means for delivering charging current pulses from the blocking oscillator to one or more series connected batteries, an improvement wherein said blocking oscillator includes a transformer having a primary winding, a secondary winding and a tertiary winding, and comprises means providing reverse current flow into said tertiary winding from the battery or batteries thereby inducing a voltage in said secondary winding and driving the blocking oscillator to produce charging current pulses.

22. The improved battery charger of claim 21, including a diode connected in series with said tertiary winding across the battery or batteries.

23. The improved battery charger of claim 22, further including a capacitor connected in parallel with the diode.

24. The improved battery charger of claim 23, wherein the circuit across the battery or batteries is free of any smoothing capacitor.

25. The improved battery charger of claim 22, wherein the circuit across the battery or batteries is free of any smoothing capacitor.

26. The improved battery charger of claim 21, further including means responsive to terminal voltage of one battery for removing it from the charging current path whenever the one battery is or becomes substantially fully charged.

27. In a battery charger of the driven blocking oscillator type which includes a blocking oscillator and means for delivering charging current pulses from the blocking oscillator to a plurality of series connected batteries, an improvement wherein said blocking oscillator includes a transformer having a primary winding, a secondary winding and a tertiary winding, and comprises means providing reverse current flow into said tertiary winding from at least one of the batteries thereby inducing a voltage in said secondary winding and driving the blocking oscillator to produce charging current pulses.

28. In a battery charger of the driven blocking oscillator type which includes a direct current power supply, a blocking oscillator including a semiconductive circuit component having a base, a collector and an emitter, and means for delivering charging current pulses from the blocking oscillator to one or more series-connected batteries, an improvement comprising means, including a series-connected resistive-capacitive network connected across the power supply, responsive to initial application of power to the blocking oscillator for producing a voltage spike across at least a portion of the resistive component of the network and means for coupling at least a portion of the voltage spike to the base.

29. The improved battery charger of claim 28, further including a transistor having a base, its collector-emitter path being connected between said base of said semiconductive circuit component and a point of reference potential, wherein a resistance is connected between said emitter of said semiconductive circuit component and the point of reference potential, and wherein a further resistor is connected between the emitter of said semiconductive circuit component and the base of the transistor.

30. The improved battery charger of claim 28, further including an SCR connected between said base and a point of reference potential, wherein a resistance is connected between said emitter and the point of reference potential, and wherein a diode is connected between the emitter and the gate of the SCR.

31. In a battery charger of the driven blocking oscillator type which includes a blocking oscillator including a transistor having a base, a collector and an emitter, a point of reference potential and means for delivering charging current pulses from the blocking oscillator to one or more series-connected batteries, an improvement comprising an SCR including a gate and having its anode-cathode path coupled between the base of the transistor and the point of reference potential, a resistive circuit component connected between the emitter of the transistor and the point of reference potential, the gate of said SCR being coupled to the emitter of the transistor.

32. The improved battery charger of claim 31, including a diode, the gate of said SCR being coupled to the emitter of the active circuit component via the diode.

33. In a battery charger of the driven blocking oscillator type which includes a point of reference potential, a blocking oscillator including a first transistor having a base, a collector and an emitter and means for delivering charging current pulses from the blocking oscillator to one or more series-connected batteries, an improvement comprising a first capacitor and a first resistor connected in series between the collector of the first transistor and the emitter of the first transistor to couple a conduction initiating pulse to the first transistor and drive the blocking oscillator, a second transistor having its collector coupled to said base of the first transistor and its emitter coupled to the point of reference potential, said emitter of said first transistor being connected to the point of reference potential via a second resistor, a series circuit including a third resistor and a fourth resistor, the base of said second transistor being coupled to a circuit point between the third and the fourth resistors, and wherein a circuit point between the second capacitor and the fourth resistor is connected to a supply point via a fifth resistor.

* * * * *